March 8, 1966  C. C. RAYBURN  3,239,720
CAPACITOR CONSTRUCTION AND MOUNTING THEREOF
Filed April 21, 1964
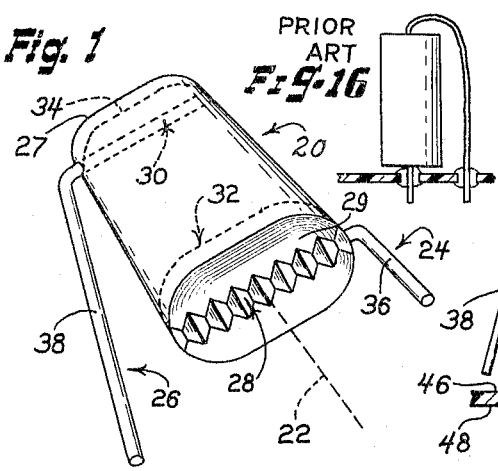
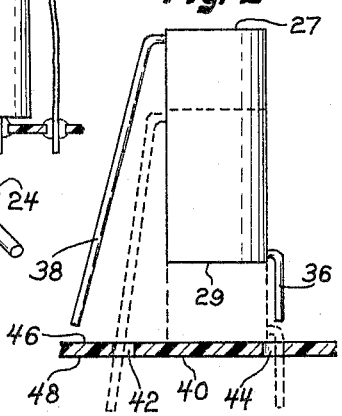
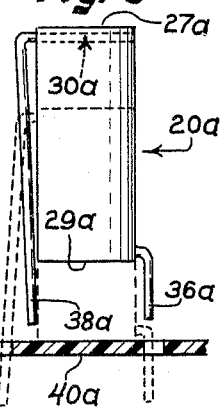
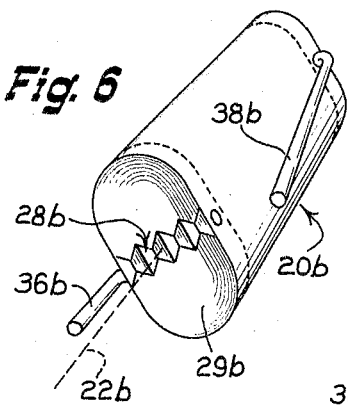
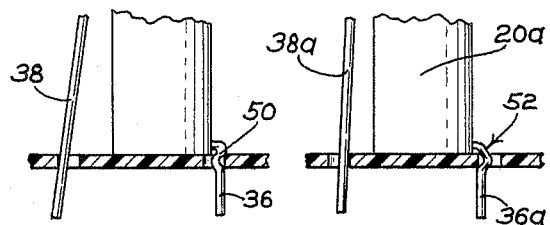
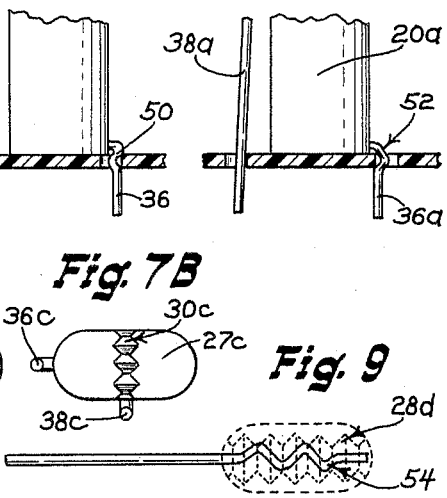
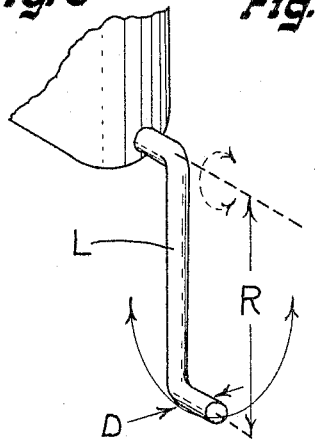
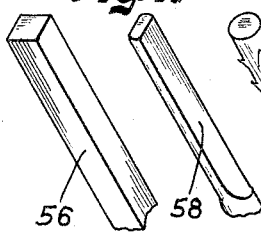
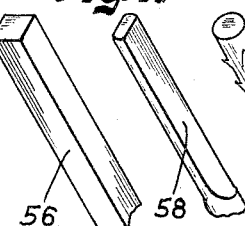
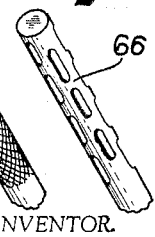
INVENTOR.
Charles C. Rayburn
BY
His Att'y

United States Patent Office 3,239,720
Patented Mar. 8, 1966

3,239,720
CAPACITOR CONSTRUCTION AND MOUNTING THEREOF
Charles C. Rayburn, Falls Church, Va., assignor to Illinois Tool Works Inc., Chicago, Ill., a corporation of Delaware
Filed Apr. 21, 1964, Ser. No. 361,350
7 Claims. (Cl. 317—101)

This invention relates in general to capacitor constructions and more particularly relates to capacitor constructions adapted to be mounted on an end surface thereof and the assembly so formed.

A printed circuit board is an interconnection matrix. Ways are always being sought to minimize its area to reduce cost. Also, the smaller circuit board lends itself to greater versatility in arrangement with other elements of a particular equipment construction such as an electronic chassis or the like.

Convolutely wound capacitors, being generally cylindrical in form, are more economically produced in a generally pencil-like form than in a disc form. This obtains because a fixed length is provided at each end for "margins," the margins in a capacitor being the necessary spacing of the lead wires attached to one metallic foil from the closely adjacent edge surface of the other metallic foil which is in turn attached, at its other edge surface to the other lead wire which is also in spaced relationship to the first foil's other edge surface. Margin spacing is a function of the capacitor's rated voltage and is not a function of the capacitor geometry. It follows that the margin material is reduced by making the capacitor long with a small diameter. Thus, the pencil shape is advantageous. Further, the pencil type shape of capacitor also reduces the "turns" requirement, making winding more efficient. It generally obtains that a long thin capacitor satisfies the requirements of good winding, minimum material usage, and minimum printed board area if it is mounted on one end thereof.

End mounting of long thin capacitors has been previously recognized as having advantages. It is primarily used in applications where space saving is vital (as, for example, in personalized transistor radio receivers and in some applications such as commercial television receivers where printed circuit board cost reduction is of great importance).

At the center top of the drawings, a prior art form of end mounting of capacitors is shown in FIG. 16, said prior art approach being in commercial usage. One feature of this prior art approach is that it utilizes a conventional "axial" lead (by "axial" lead it is meant that each of the lead wires extend from the capacitor generally along the winding axis of the capacitor). One lead is cut short to just project through the printed circuit board for soldering and the other lead is hand formed over the top and along the side edge to project the same distance through the circuit board. Occasionally, electrical tape is wound around the long lead to captivate same against the capacitor case, this operation generally being performed by the equipment manufacturer just prior to the printed board assembly soldering operation.

Since it is usual procedure to assemble many components on a single circuit board, it is apparent that the components are not all assembled thereto simultaneously. The general procedure is to assemble the separate components of the circuit board, and after all are assembled thereto, a soldering operation (usually by dip soldering) to firmly fix and electrically connect the components on the board and relative to the printed electrical pattern respectively, is generally accomplished by automatic machinery. Problems have been noted relative to assembly of prior art components (axial lead capacitors mounted on an end surface thereof) prior to the soldering operation, namely:

(A) The components are often dislodged from the board while the other components are subsequentially being assembled into the board;

(B) Components often become tilted and/or elevated from the mounting holes as they are slapped or vibrated by the assembler or automatic machinery which handles the circuit boards for the soldering processes; and (C) Immediately subsequent to actual soldering of the components upon the board in the automatic soldering apparatus, the movement of the board from the soldering station for subsequent processing involves mass in motion problems or vibration problems such that the component leads may move in the holes while the solder is solidfying thereby producing a poor soldered joint.

It will be observed that the prior art capacitor construction and mounting thereof poses particular problems since the capacitor centroid is high. The acceleration experienced by the printed circuit board, as it is indexed through the soldering operation causes torques to be exerted on the capacitor, by virtue of its inertial reaction, which in turn causes it to rock and tumble from its initial position.

Another problem with the prior art mounting arrangement is that conductive objects or other circuit components may touch the top of the capacitor inadvertently which causes shorting. Still another problem encountered with the prior art capacitor is the cost involved with the axial leads in that the top or long lead requires a 180° bend and thus necessarily requires more lead wire. Another problem noted relative to the prior art construction relates to the end which is closely adjacent to the circuit board. The nature of the axial leads is such that it is virtually impossible to provide an end surface for the capacitor which is exactly transverse to the winding axis without the addition of extra material for this specific purpose (but at added cost). If added dielectric material is not placed on the construction then in addition to an irregular surface, problems are encountered for use of the capacitor construction in "double clad" type circuit boards.

It is a general object of this invention to provide a capacitor construction which overcomes the aforenoted problems of the prior art.

It is a further object of this invention to provide a capacitor construction having the leads thereon arranged for attachment of the capacitor to a circuit board which is preconfigured by the capacitor manufacturer and thus greatly reduces assembly time by the equipment manufacturer.

It is another object of this invention to provide a vertically mounted lead-locking arrangement which is easier to insert in a printed circuit board than prior art type of component leads.

It is a further object of this invention to provide a component as above described which is relatively less expensive in amount of materials required, which is stable in its temporary position prior to soldering, and is so arranged as to make overall height repetitive and controlled.

Still another object of this invention is to provide a capacitor lead-locking arrangement which provides positive results in spite of small dimensional variances in the size of the wire of the lead as well as in the size of the holes in which the leads are inserted.

A further object of this invention is to provide a capacitor construction particularly well adapted for end mounting thereof wherein the capacitor is resiliently biased to a stable position by one of the capacitor leads in cooperation with the apertures in the circuit board.

Still another object of this invention is to provide, in certain forms of the invention, a capacitor construction which, by the nature of the configuration of the leads, is well adapted for high temperature operation of the capacitor in that the nature of the resilient bias of the lead for mounting of the capacitor simultaneously aggressively urges the other end of the lead attached to the capacitor end toward aggressive engagement with the electrode foils whereby softening or loosening of the dielectric material in the high temperature environment does not derate the lead to electrode foil connection.

A still further object of the invention is to provide a capacitor construction for the aforenoted purposes wherein both ends of the capacitors are insulated and thus inadvertent engagement with conductive objects on the end surfaces does not cause shorting, said construction being obtained without additional cost of adding unnecessary dielectric material as a secondary operation in the manufacturing process.

A still further object of the invention is to provide a capacitor lead construction for vertically mounted capacitors wherein there is spring loaded tension of the capacitor in two spaced apertures which keep the capacitor from leaning as it goes into the soldering process, keeps the capacitor from floating up as it leads are immersed in the solder, and holds a capacitor firmly as it is being indexed from soldering position thereby preventing poor solder joints.

A still further object of the invention is to provide a vertical capacitor mounting construction wherein a plane stable seating surface is provided to reference the capacitor axis perpendicular to the printed circuit board.

The novel features that are characteristic of the invention are set forth with particularity in the appended claims. The invention itself, however, both as to its organization and method of operation, together with additional objects and advantages thereof will best be understood by the following description of specific embodiments when read in connection with the accompanying drawings, in which:

FIG. 1 is a perspective view of one form of my novel capacitor construction;

FIG. 2 is a side elevational view, the full line portion showing the capacitor of FIG. 1 prior to insertion and the dotted line showing the position after insertion of the capacitor to a circuit board;

FIG. 3 is a side elevational view similar to FIG. 2 of another embodiment of the invention;

FIG. 4 is a partial view of the capacitor shown in FIG. 2 with a modification of the short lead of the capacitor;

FIG. 5 is a view similar to FIG. 4 of the capacitor shown in FIG. 3 with a modification in the short lead of the capacitor;

FIG. 6 is a perspective view of another embodiment of the invention;

FIGS. 7A and 7B are bottom and top views respectively of still another embodiment involving my inventive concepts;

FIG. 8 is a semidiagrammatic view illustrating torque relationships that may be encountered with the foregoing embodiments of capacitors;

FIG. 9 is a semidiagrammatic view of one form of antirotation means in the lead construction at the lead to capacitor area of the unit;

FIGS. 10 through 15 are views of the end portions of capacitor leads which have antirotation means therein for connection to the capacitor body portion;

FIG. 16 is a side view showing end mounted capacitors of the prior art.

Returning now to FIG. 1 of the drawings, a capacitor 20 may be convolutely wound on a winding axis 22 into generally cylindrical form which is then flattened (to close up the mandrel "hole") for the purpose of conserving space. Wound capacitors are normally fabricated of strips or tapes of conductive material such as a metal or a conductive coated dielectric wound into a tight coil. In winding the capacitor coil, two or more conductive tapes are wound together with dielectric material between the conductive tapes to insulate them from each other. In forming the capacitor coil, the conductive tapes are staggered so that the edge of one tape extends beyond one edge of the other tape while the opposite edge of the other tape extends beyond the corresponding edge of the first. Thus, in winding the condenser or capacitor coil, two conductive tapes are wound in staggered arrangement with the dielectric material positioned:

(A) Only between the overlapping portions of the two tapes;

(B) With the dielectric material positioned between the overlapping portions of the two tapes and extending out to the edge surfaces of the respective tapes; and (C) With the dielectric material not only extending completely across all of the electrode foil tape portions but additionally extending beyond the edge surfaces of the electrode foil portions.

The particular construction of wound capacitor 20 shown in the drawings is the general type shown in my co-pending application entitled Capacitor Construction and Method and Apparatus for Accomplishing Same, Serial No. 258,574, filed February 14, 1963 and assigned the same assignee. That patent application teaches the formation of "ribs" in a so-called "extended film" construction of capacitor (type "C" above) utilizing aluminum electrode foils, said ribs providing exceptionally good pull out strength charactristics and other advantages. While the formation of the ribs and the utilization of the teachings of my aforementioned patent application are efficacious in providing superior results for certain features of the concepts about to be discussed, it will be realized that in certain other respects the features of this invention have a broader implication and thus the use of the ribs for securing the leads to the capacitor body is to be considered illustrative rather than limiting.

In construction shown in FIG. 1, the capacitor body 20 has a pair of leads 24 and 26 each of which are disposed radially of the winding axis in those portions 28 and 30 which are disposed adjacent to the respective electrode foils indicated diagrammatically at 32 and 34. It will be noted that those portions of the lead members 24 and 26 which are locked to the capacitor body do not extend beyond the end surfaces 27 and 29 as perhaps best shown in FIG. 2. As aforementioned, it is preferred that the leads be attached to the capacitor body in accordance with the teachings of my aforementioned application. For manufacturing considerations, with use of automatic machinery, it is slightly easier in certain types of apparatus to have the leads traverse the long dimensions of the end surface rather than the short dimension as shown in FIG. 6 with capacitor 20C. In both capacitor constructions 20 and 20B (and, in fact, in all capacitor constructions shown in all of the figures) the lead wires engage every winding of electrode foils in at least one and preferably in two places thus preventing the capacitor from having inductive effects.

It will be noted that each of the leads 24 and 26 emanate from the capacitor body in opposite directions as measured in a plane transverse to the winding axis 22. Each of the wires 24 and 26 is bent at a large angle relative to the portion thereof that is traversing the capacitor body end surfaces 27 and 29. In the case of the short lead means 24, the bent portion 36 is disposed substantially parallel to the winding axis 22, i.e., it is bent approximately 90°. The long lead means 26 is bent in the same general direction as lead means 24 but preferably it is slightly oblique to the capacitor axis so it will be compressed as it is inserted into the printed circuit board as shown in FIG. 2. As shown in FIG. 3 the long lead 38a may be initially slightly bent inwardly toward the winding axis or initially disposed parallel thereto and then extended outwardly from the capacitor body so as to spring load the two leads 36 and 38 against the margins of the aperatures 42 and 44 of the circuit board 40. It will be realized that the circuit board 40 may have printed circuitry on both sides 46 and 48 or on only one side depending upon particular circuits and design parameters of the equipment builder.

Both of the forms shown in FIGS. 2 and 3 are satisfactory for moderate operating temperatures. For long term high temperature operation (125° C. and above), the configuration shown in FIG. 3 is preferable. In this embodiment, the stress set up by the long lead being pulled to the left as viewed in FIG. 3 causes the portion 30a to be more aggressively stressed into engagement with the electrode foils (assuming that the bottom portion of the leads 38a and 36a are firmly anchored by solder to the bord 40a and the pivoting action of the lead 38a takes place about its point of emanation from the capacitor body 20a). Of course, the converse applies to the embodiment shown in FIG. 2, and thus at very high operating temperatures which affect the plasticity of the dielectric material, in the form shown in FIG. 2, there will be a tendency or the dielectric bond to the lead wire to relax causing the lead to move outwardly and away from engagement with the foil.

It will be noted that the capacitor body ends 27 and 29 will always have precise relationships to the circuit board 40. End surface 29 fits flush with surface 46 and no part of the lead means 24 extends axially beyond surface 29 except at the portion 36 adjacent the board aperture 44 where it is bent downwardly. Surface 27 extends above any part of any of the lead wires and will always be the same predetermined distance above the circuit board. Objects engaging the top surface 27 will not engage any portion of the lead to short out the capacitor and, where component density is a design parameter, the designer can count on uniform height with this construction. The stability imparted to the mounting by the spring loading occasioned by the oblique disposition of the long lead assures that the capacitor will pass through the soldering operation without becoming unseated and that a good solder joint is formed relative to those portions adjacent the free ends of the respective leads with circuitry adjacent the apertures 42 and 44.

It will be seen that the particular arrangement shown in FIGS. 2 and 3 will accommodate themselves to variable hole spacing. In circuit board layout, circuit space is often dimensionally difficult to arrange. The same capacitive value may be required at several points in the circuit, but all points may not be satisfied by the same hole spacing. With the variable spacing features inherent by the oblique disposition of the long lead means 26, identical capacitors may be purchased and stocked in quantities to optimise the purchase and inventory economy on the part of the manufacturer of the equipment while satisfying a variety of hole spacing requirements.

The embodiments shown in FIGS. 4 and 5 show upsets at 50 and 52 in the respective leads 36 and 36a to provide an even more positive lead-locking arrangement. Basically, the upsets 50 and 52 are kinks configured to cooperate with the margins of the panel board apertures and with the respective long leads 38 and 38a. The bias imposed upon the leads 36 and 36a by the long leads to cause the respective upsets 50 and 52 to engage the top and bottom surfaces of the panel will be apparent from the drawing. The upsets prevent upward or tilting movement of the capacitor during motion of the board prior to soldering. The same effect may be accomplished by using a knurled surface on the lead 36 (such as shown in FIG. 14).

The use of a long lead member such as 38 may pose in particular applications, stresses on the joint between the lead member and the dielectric film of the capacitor body. As shown in FIG. 8 in diagrammatic form, if the lead member L is bent to form a crank, a torque FR may be applied to the crank. A shearing force $f$ is exerted on the bonding surface between the wire and the dielectric resin which is $f = 2FR/D$. Assuming values of $D = .03$ inch, $R = 1.5$ inches, and $F = \frac{1}{2}$ pound; $f$ becomes 50 pounds. Depending on the total joint area and the nature of the bond, this shear force is adequate to actually break the bond allowing the wire to rotate freely thereby electrically opening the lead wire to electrode foil connection. Antirotation means such as shown at 54, 56, 58, 60, 62, 64, and 66 imparted to the lead wire, particularly in the area where it traverses the capaictor end surface are effective in counteracting rotation, since rotation requires actual shearing of the dielectric material which is formed tightly against the irregular wire surface. The lead irregularity may be continued along the length of the lead wire or it may be localized in the vicinity of the joint. The use of antirotation means in the original construction of the capacitor is advantageous in having a versatile capacitor which will not only be well adapted for mounting to various hole spacings in a circuit board but which will also be adapted for use with hand wiring applications which requires twisting or bending of the long lead member.

The embodiment of the invention shown in FIGS. 7A and 7B shows that a great versatility is available in the various capacitor constructions using the same general approach. In the embodiment shown in FIGS. 7A and 7B it will be seen that the long lead member 36c traverses the end surface across the major diameter of the coil whereas the short lead wire 38c crosses the short diameter of end surface 27c. As shown in FIG. 6 both of the capacitor lead wires may traverse the minor diameter of the capacitor coil 20B. The shape shown in FIGS. 7A and 7B requires less printed circuit mounting area than the shape shown in FIGS. 2 and 3.

Various embodiments of the invention have been shown and described, and it is with full awareness that many modifications thereof are possible. The invention, therefore, is not to be restricted, except as required by the prior art and the spirit of the appended claims.

I claim:
1. A convolutely rolled capacitor comprising electrode foil means and thermoplastic dielectric means wound in a coil on a winding axis to provide spaced end surfaces, lead means embedded in each end surface and in an electrical contact with said electrode foil means, each of said lead means being disposed transversely to said winding axis and extending radially outwardly beyond the configuration of each said end surface in different directions relative to each other, substantially all of those portions of each of said lead means extending beyond the configuration of each said end surface being generally aligned parallel with said winding axis, both of said lead means being of sufficient length to extend beyond one predetermined end surface of said capacitor.

2. The capacitor set forth in claim 1 wherein the longer lead means is disposed at a relatively shallow angle to said winding axis and the shorter lead means is disposed substantially parallel to said winding axis.

3. The capacitor set forth in claim 1 wherein the shorter lead means is provided with upset means intermediate the free end thereof and the point of emanation from said end surface of said capaictor.

4. The capacitor set forth in claim 1 wherein said lead means are formed with antirotation means at least that portion thereof in electrical contact with said electrode foil means.

5. The capacitor set forth in claim 1 wherein said lead means emanate from said capacitor end surfaces as measured radially from said winding axis in 180° relationship.

6. The capacitor set forth in claim 1 wherein said lead means emanate from said end surfaces in 90° relationship as measured in a plane transverse to the winding axis.

7. In combination, a circuit board having a pair of spaced apertures, a capacitor coil comprising electrode foil means and thermoplastic dielectric means convolutely wound in a coil to provide spaced end surfaces, lead means embedded in each of said surfaces generally transverse to the winding axis of said coil, one of said lead means being relatively short and one of said lead means being relatively long, each of said lead means emanating from said capacitor coil in different directions as measured in a plane transverse to the winding axis of said coil, said lead means being disposed generally parallel to the winding axis, one of said lead means having a free end initially spaced relative to the free end of the other side lead means a distance different from the distance between said spaced apertures in said circuit board whereby insertion of said first lead means and said second lead means into said spaced apertures will impart a bias in said lead means to maintain the capacitor in stable relationship with said board when the end surface of said capacitor coil is disposed flush with the surface of said circuit board.

References Cited by the Examiner

UNITED STATES PATENTS

| | | | |
|---|---|---|---|
| 2,615,946 | 10/1952 | Katzman | 317—242 X |
| 2,982,883 | 5/1961 | Gordy | 317—101 |
| 3,056,939 | 10/1962 | Rayburn. | |
| 3,134,059 | 4/1964 | Rayburn | 317—260 |
| 3,162,721 | 12/1964 | Rayburn | 317—101 |

FOREIGN PATENTS 907,596 10/1962 Great Britain.

ROBERT K. SCHAEFER, *Primary Examiner.*

JOHN F. BURNS, *Examiner.*

E. GOLDBERG, *Assistant Examiner.*